United States Patent
Izquierdo

(10) Patent No.: US 7,489,797 B2
(45) Date of Patent: Feb. 10, 2009

(54) METHOD AND APPARATUS FOR FRAGILE WATERMARKING

(75) Inventor: Ebroul Izquierdo, London (GB)

(73) Assignee: Motorola, Inc., Schaumburg, IL (US)

( * ) Notice: Subject to any disclaimer, the term of this patent is extended or adjusted under 35 U.S.C. 154(b) by 107 days.

(21) Appl. No.: 10/567,735

(22) PCT Filed: Jun. 28, 2004

(86) PCT No.: PCT/EP2004/051265

§ 371 (c)(1),
(2), (4) Date: Jul. 26, 2006

(87) PCT Pub. No.: WO2005/015493

PCT Pub. Date: Feb. 17, 2005

(65) Prior Publication Data

US 2007/0009134 A1    Jan. 11, 2007

(30) Foreign Application Priority Data

Aug. 8, 2003 (GB) ................... 0318651.7

(51) Int. Cl.
*G07K 9/00* (2006.01)

(52) U.S. Cl. ............... 382/100; 382/100; 382/232; 382/240; 380/51; 380/54; 380/201; 380/210; 380/252; 713/176; 713/179; 370/522; 370/529; 358/3.28; 283/72; 283/113; 283/901; 283/902

(58) Field of Classification Search ............. 382/100, 382/232, 240; 380/51, 54, 201, 210, 252, 380/287; 370/522–529; 283/72, 74–81, 283/85, 93, 113; 713/176, 186
See application file for complete search history.

(56) References Cited

U.S. PATENT DOCUMENTS

| | | | | |
|---|---|---|---|---|
| 5,960,081 A | * | 9/1999 | Vynne et al. | 713/176 |
| 6,064,764 A | * | 5/2000 | Bhaskaran et al. | 382/183 |
| 6,633,653 B1 | | 10/2003 | Hobson et al. | |
| 7,061,510 B2 | * | 6/2006 | Rhoads | 345/634 |
| 7,401,048 B2 | * | 7/2008 | Rosedale et al. | 705/37 |
| 2002/0178368 A1 | | 11/2002 | Yin | |
| 2003/0070075 A1 | | 4/2003 | Deguillaume | |
| 2005/0144454 A1 | | 6/2005 | Hare | |
| 2007/0172094 A1 | * | 7/2007 | Ho et al. | 382/100 |
| 2007/0223778 A1 | | 9/2007 | Hare | |

FOREIGN PATENT DOCUMENTS

EP    0947953 A2    10/1999

(Continued)

OTHER PUBLICATIONS

SVD Based Approach to transport embedding data into digital images, Gorodetski et al.*

(Continued)

*Primary Examiner*—Andrew W. Johns
*Assistant Examiner*—Nancy Bitar
(74) *Attorney, Agent, or Firm*—Valerie M. Davis

(57) ABSTRACT

A method of fragile watermarking is characterized by the step of generating at least a first ill-conditioned operator, said ill-conditioned operator being related to values extracted from an image or portion thereof A.

17 Claims, 1 Drawing Sheet

FOREIGN PATENT DOCUMENTS

| | | |
|---|---|---|
| GB | 2370437 A | 6/2002 |
| GB | 2377575 A | 1/2003 |
| JP | 947953 | * 10/1999 |

OTHER PUBLICATIONS

Digital Image watermarking using Singular value decomposition, Chandra et al.*

Sun et al., A SVD and quantization based semi-fragile watermarking technique for image authentication. Aug. 2003.*

Wong, A public key watermark image verification and authentication, 1998.*

Chandra, "Digital Image Watermarking Using singular Value Decomposition", 2002 45th Midwest Symposium on Circuits and Systems. Conference Proceedings (Cat. No. 02CH37378) IEEE Piscataway, NJ USA, vol. 3, 2002, pp. III-24-III-267, XP002300902; ISBN: 0-7803-7523-8, Section 3.

Gorodetski, et al., "SVD-Based Approach to Transparent Embedding Data into digital Images", Information Assurance in Computer Networks, Methods, Models and Architecture for Network Security. International workshop MMM-ACNS 2001. Proceedings (Lecture Notes in Computer Science vol. 2052) Springer-Verlag Berlin, Germany, 2001, pp. 263-274, XP002300903, ISBN: 3-450-42103-3, Section 3.

Lei, et al., "Using Ill-posed Matrix in Correlation-based Digital Watermarking", Proceedings of the SPIE-the International Society for Optical Engineering SPIE-Int. Soc. Opt. Eng USA, vol. 4861, 2002, pp. 183-191, XP002300904, ISSN: 0277-786X: p. 184-185.

Ruizhen, et al., "An SVD-based Watermarking Scheme for Protecting Rightful Ownership", IEEE Transactions on Multimedia IEEE USA, vol. 4, No. 1, Mar. 2002 (2002-2003), pp. 121-128, XP008036943, ISSN: 1520-9210, Section III B.

Rui Sun, et al., "A SVD-and Quantization Based Semi-Fragile Watermarking Technique for Image Authentication", Proceedings of the ICSP, vol. 2, Aug. 26, 2002 pp. 1592-1595, XP010627843, Abstract, Section 3.

* cited by examiner

METHOD AND APPARATUS FOR FRAGILE WATERMARKING

This application claims the benefit of prior filed co-pending international application Ser. No. PCT/EP2004/051265 filed on Jun. 28, 2004, and Great Britain application Ser. No. 0318651.7 filed on Aug. 8, 2003. Both of these applications are assigned to Motorola, Inc.

TECHNICAL FIELD OF THE INVENTION

The invention relates to a method and apparatus for fragile watermarking, and in particular a method and apparatus for fragile watermarking and a method for validating such a fragile watermark.

BACKGROUND

Photographs, paintings, film material and other artistic works have for many years been recorded and transmitted using analogue carriers. However, their reproduction and processing is time consuming, involves a heavy workload and leads to degradation of the original material. This means that content produced and stored using analogue devices has an in-built protection against unintentional changes and malicious manipulation. In general, deliberate changes in analogue media are not only difficult but can easily be perceived by a human inspector.

Recently however, digital media have become pervasive, and threaten to completely substitute their analogue counterparts. Furthermore, affordable media processing tools and fast transmission mechanisms are ubiquitous. As a consequence digital content can nowadays be accurately copied, processed and distributed around the world within seconds. Creators, legitimate distributors and end-users enjoy the flexibility and user friendliness of digital processing tools and networks to copy, process and distribute their content over open digital channels at high speed. However, they also need to guarantee that material used or being published at the end of the distribution chain is genuine. Consequently, automatic tools to establish the authenticity and integrity of digital media are highly important.

Secure communications problems have largely found a solution in cryptography, which guarantees message integrity by using digital signatures with secret keys. However, traditional cryptosystems do not permanently associate cryptographic information with the content. Cryptographic techniques do not embed information directly into the message itself, but rather hide a message during communication.

To provide security by using signatures embedded directly in the content, additional methods need to be considered. Techniques that have been proposed to address this problem belong to a more general class of methods known as digital watermarking, as for example may be found in *Signal Processing,* Special Issue on Watermarking, vol. 66, no. 3 May 1998.

Several watermarking schemes that address image authentication have been previously developed and fall into two basic categories: fragile and semi-fragile.

Fragile watermarking schemes address the detection of any image changes. Semi-fragile watermarking schemes are designed to discriminate between expected image changes, in most cases due to application constraints, e.g., compression to meet bandwidth requirements, and intentional image tampering.

In the case of fragile watermarking, a number of schemes exist in the prior art:

One prior scheme is proposed in S. Walton, "Information Authentication for a Slippery New Age", Dr. Dobbs Journal, vol. 20, no. 4, April 1995, pp. 18-26. The scheme uses a check-sum built from the 7 most significant bits of a given pixel, which is then inserted as the least significant bit of the pixel. However, the watermark has only limited security, primarily due to the ease of calculating new check-sums.

Another prior fragile watermarking scheme is proposed in M. M. Yeung and F. Mintzer, "An Invisible Watermarking Technique for Image Verification", Proc. ICIP, Santa Barbara, Calif., 1997. The Yeung-Mintzer algorithm uses a secret key to generate a unique mapping that randomly assigns a binary value to grey levels of the image. This mapping is used to insert a binary logo or signature in the pixel values. Image integrity is inspected by direct comparison between the inserted logo or signature and the decoded binary image. The main advantage of this algorithm is its high localization accuracy derived from the fact that each pixel is individually watermarked. However, the Yeung-Mintzer algorithm is vulnerable to simple attacks as shown in J. Fridrich, "Security of Fragile Authentication Watermarks with localization", Proc. SPIE, vol. 4675, No. 75, January 2002.

A third prior scheme for image authentication is proposed in P. W. Wong, "A Public Key Watermark for Image Verification and Authentication", Proc. ICIP, Chicago, Ill., October 1998. This scheme embeds a digital signature extracted from the most significant bits of a block of the image into the least significant bit of the pixels in the same block. However this scheme was shown to be vulnerable to a counterfeiting attack in M. Holliman and N. Memon, "Counterfeiting Attacks on Oblivious Block-Wise Independent Invisible Watermarking Schemes", Proc. IEEE Trans. on Image Processing, vol 9, no 3, March 2000, pp. 432-441. This attack belongs to the class of vector quantization counterfeiting and has been shown to defeat any fragile watermarking scheme that achieves localization accuracy by watermarking small independent image blocks.

One common feature of these and other prior schemes from the literature is that authentication signatures are embedded in the image content, either in the pixel or a transform domain, and the security of the schemes resides in a hash or encryption mechanism.

This ultimately leaves such schemes vulnerable to the attacks noted above.

Thus there is a need for an alternative method of fragile watermarking.

The purpose of the present invention is to address the above problem.

SUMMARY OF THE INVENTION

The present invention provides a method of fragile watermarking, characterised by the step of generating at least a first ill-conditioned operator, said ill-conditioned operator being related to values extracted from an image or portion thereof A.

In a first aspect, the present invention provides a method of fragile watermarking, as claimed in claim 1.

In a second aspect, the present invention provides a method of verifying a fragile watermark.

In a third aspect, the present invention provides apparatus for fragile watermarking.

In a fourth aspect, the present invention provides apparatus for verifying a fragile watermark.

Further features of the present invention are as defined in the dependent claims.

Embodiments of the present invention will now be described by way of example with reference to the accompanying drawings, in which:

DETAILED DESCRIPTION OF EMBODIMENTS OF THE INVENTION

Figure 1:
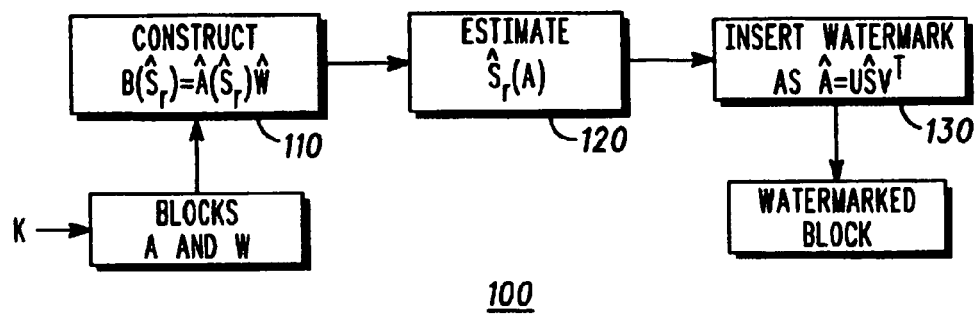
FIG. 1 is a block diagram of a method of fragile watermarking in accordance with an embodiment of the present invention.
Figure 2:
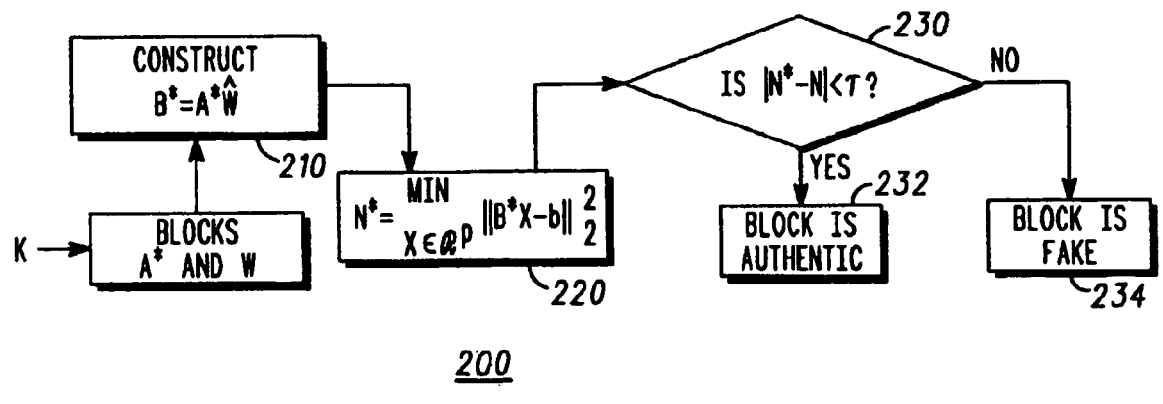
FIG. 2 is a block diagram of a method of verifying a fragile watermark in accordance with an embodiment of the present invention.

Referring to FIGS. 1 and 2, a method of fragile watermarking 100 and a method of validating said fragile watermark 200 are shown. In the following description, a number of specific details are presented in order to provide a thorough understanding of an embodiment of the present invention. It will become clear, however, to a person skilled in the art that these specific details need not be employed to practise the present invention. In other instances, well known methods, procedures and components have not been described in detail in order to avoid unnecessarily obscuring the present invention.

1. Fragile Watermarking

An embodiment of the present invention provides a method providing an essentially different approach from those reported in the prior art. This method is based on the inherent instability property of inverse ill-conditioned problems, and the fact that small changes to their input data cause large changes in any approximate solution. Singular valued decomposition and other fundamental linear algebra tools are used to construct an ill-conditioned matrix interrelating the original image and the watermark pattern. This is achieved by exploiting the relationship between singular values, the least square solution of linear algebraic equations and the high instability of linear ill-conditioned operators.

In brief, an embodiment of the present invention performs a fragile watermarking method on blocks (portions) of pixels extracted from the image to be watermarked, the values in this block being treated as a matrix for the purposes of analysis.

Similarly, blocks of pixels of corresponding size are taken from a watermark pattern, or are generated to resemble such blocks.

The smallest singular value of the matrix of the watermark is replaced to artificially create an ill-conditioned minimization problem. The solution to this problem involves a least squares approximation of the previously defined ill-conditioned operator in order to find an unknown parameter.

This solution process links the watermark with the image using the underlying ill-conditioned operator. An image block is considered watermarked by setting its smallest singular value equal to a parameter estimated from the minimization task.

Thus, the watermark is spread over the whole image in a subtle but quite complex manner. One advantage of this method is that the distortion induced by the watermarking procedure can be strictly controlled since it depends only on changes in the smallest singular values of each block.

The verification procedure solves the same optimisation problem and compares the norm of the solution with a large secret number N used in the generation of the watermark.

Any small change to the image will therefore result in the norm of the solution differing significantly from the large secret number N, due to the property of the ill conditioned operator to produce highly differing solutions in response to small changes in the input values.

By contrast, known methods of watermarking have considered the presence of ill-conditioned operators to be an unintended nuisance that must be overcome, such as U.S. Pat. No. 6,282,300 (Bloom), e.g. during watermarking validation.

The method will now be described in detail;

Firstly, to illustrate how an ill-conditioned operator may be used to provide a watermark, consider that in many known applications of linear algebra, it is necessary to find a good approximation $\hat{x}$ of an unknown vector $x \in \Re^n$ satisfying the linear equation $$Bx = b, \qquad \text{Eq. 1}$$

for a given right-hand side vector $b \in \Re^n$. The degree of difficulty in solving Eq. 1 depends upon the condition number of the matrix B. The vector $\hat{x}=B^+b$ would seem to be a solution of Eq. 1, where, $B^+=(B^TB)^{-1}B^T$, i.e., $B^+$ denotes the pseudo-inverse of B.

However, if B is ill-conditioned or singular then $\hat{x}=B^+b$, if it exist at all, is a poor approximation of x.

An error estimate given by $\|x-\hat{x}\| \leq \|B^+\| \|B\hat{x}-b\|$ shows that the approximation error can grow proportional to the norm of the inverse of B. Since the norm of the inverse of B is proportional to the condition number of B, it is evident that the more the ill-conditioning of B, the larger the different between x and $\hat{x}$.

Furthermore, the estimation of the inverse of an ill-conditioned matrix is not straightforward, and clearly is essentially the same problem as seen in Eq. 1. Moreover, when B is ill-conditioned, solving Eq. 1 becomes equivalent to solving the optimisation problem $$\min_{x \in \Re^n} \|Bx - b\|^2$$

for a predefined norm $\|.\|$. It is well-known in the art that the $L_2$-norm solution of this least squares problem is given by $$\hat{x} = \sum_{s_i(B) \neq 0} \frac{u_{A_i}^T b}{s_i(B)} v_i. \qquad \text{Eq. 2}$$

It becomes evident from Eq. 2 that errors in either any of the left singular vectors of B or in the right-hand side b are drastically magnified by the smallest of the singular values $S_i(B)$ of B.

In an embodiment of the present invention, an ill-conditioned operator B is generated that is related to values extracted from an image or a portion thereof A. In this manner alterations to A will be reflected in magnified errors to a solution of $\hat{x}$ of similar form to Eq. 2.

In an embodiment of the present invention, a watermarking pattern Ω is interrelated with an image I, thus watermarking it, as follows:

Given an image I of dimensions m×n, a watermark pattern Ω of typically the same dimensions is built.

In a first embodiment, Ω is an array of pseudo-randomly generated binary or real numbers.

In an alternative embodiment of the present invention, the procedure to generate Ω uses a single or repeated instance of a logo, typically a binary pattern, combined with pseudo-randomly generated numbers; initially, a mosaic-like binary image P of dimension m×n is built by tiling the logo to occupy an area similar to the original image I. The watermark pattern is then typically defined as Ω=P⊕ω, where ω is a m×n array of pseudo-randomly generated binary numbers and ⊕ denotes the bitwise XOR operator.

In either embodiment, no assumption needs to be imposed on the statistical properties of the random number generator; the binary or real numbers used to generate the watermark can follow any probability distribution and are not restricted to Gaussian or uniform. This is because the present invention does not rely on statistical analysis for authentication or tamper detection. However it will be clear to a person skilled in the art that in consequence statistical constraints can be imposed if desired.

In either embodiment, $\Omega$ depends on a secret key K whose value seeds the pseudo-random number generator. K is subsequently also used in validating the watermark.

In an embodiment of the present invention, the watermarking process is performed in a block-wise fashion. For the sake of simplicity and without loss of generality, for the following description assume that an image I is partitioned into L small blocks or portions $A^{(k)}$, k=1, ..., L of dimensions p×q. Likewise, $\Omega$ is partitioned into L blocks or portions $W^{(k)}$, k=1, ..., L of dimensions p×q. For the sake of notational simplicity the upper index representing the block number will be omitted hereon in unless expressly referred to. Without loss of generality for the following description assume that the blocks are square, i.e., p=q=n.

Thus blocks A and W can be considered for the purpose of explanation to be generic matrices comprising values obtained from the original image and watermark, respectively.

As is known in the art, a fundamental result of Linear Algebra states that matrix A can be represented as $$A = U_A S_A V_A^T, \quad \text{Eq. 3}$$

i.e. a singular value decomposition of A, where $U_A = (u_1, \ldots, u_n) \in \mathfrak{R}^{n \times n}$ and $V_A = (v_1, \ldots, v_n) \in \mathfrak{R}^{n \times n}$. The columns $\{u_k\}$, k=1, ..., n of $U_A$ are called the left singular vectors and form an orthonormal basis, i.e., $u_i \cdot u_j = 1$, if i=j and $u_i \cdot u_j = 0$ otherwise. The rows of $V_A^T$ are the right singular vectors, $\{v_k\}$, k=1, ..., n and also form an orthonormal basis. $S_A = \text{diag}(s_1(A), \ldots, s_n(A))$ is a diagonal matrix whose diagonal elements are the singular values of A. If rank(A)=r≤n, then $s_k(A) > 0$, for k=1, ..., r, $s_k(A) \geq s_{k+1}(A)$, for k=1, ..., r−1 and $s_k(A) = 0$, for k>r. Consequently $S_r(A)$ is the smallest real positive singular value of A in $S_A$.

In an embodiment of the present invention, it is proposed to replace $S_r(A)$ with a real positive number $\hat{s}_r(A)$ as part of the process to produce a watermarked version Â of A, where the distortion introduced by the watermarking process is determined with reference to the calculation of $$\|A - \hat{A}\|_2 = |s_r(A) - \hat{s}_r(A)|, \quad \text{Eq. 4}$$

where $\|.\|_2$ denotes the $L_2$-norm, and thus the distortion is dependent upon the value of $\hat{s}_r(A)$.

Given an image or portion thereof A, the corresponding watermarked portion or block is defined as the matrix Â, generated according to the following considerations. Observe that A and Â have the same dimensions.

Initially, singular value decomposition of A and W is performed to obtain $A = U_A S_A V_A^T$ and $W = U_W S_W V_W^T$, respectively. Let $S_A = \text{diag}(s_1(A), \ldots, s_r(A))$ and $S_W = \text{diag}(s_1(W), \ldots, s_t(W))$ be the nonzero singular values of A and W respectively. The two diagonal matrices $\hat{S}_A$ 32 $\text{diag}(s_1(A), \ldots, \hat{s}_r(A))$ and $\hat{S}_W = \text{diag}(s_1(W), \ldots, \hat{s}_t(W))$ are then built by replacing the last nonzero singular values $s_r(A)$ and $s_t(W)$ by two specific real positive numbers $\hat{s}_r(A)$ and $\hat{s}_t(W)$, respectively. Here it is assumed that the smallest nonzero singular value of A is $s_r(A)$, i.e., rank(A)=r and the smallest nonzero singular value of W is $s_t(W)$, i.e., rank(W)=t. Using $\hat{S}_A$ the watermarked block Â is defined as $$\hat{A} = U_A \hat{S}_A V_A^T. \quad \text{Eq. 5}$$

Likewise, $\hat{S}_W$ is used to build an ill-conditioned matrix Ŵ according to $$\hat{W} = U_W \hat{S}_W V_W^T. \quad \text{Eq. 6}$$

Now, one should choose the two values $\hat{s}_r(A)$ and $\hat{s}_t(W)$.

In selecting values of $\hat{s}_r(A)$ and $\hat{s}_t(W)$, it is desirable to do so in such a fashion as to facilitate the fragility of the watermarking process, the uniqueness of the watermark thus made and optionally the control of perceptibility of the watermark in the final watermarked image Î.

A. Fragility

It is desired that any change to single or multiple elements of Â can be detected by a validation procedure.

In an embodiment of the present invention, replacing $s_t(W)$ with $\epsilon$ in the calculation of Eq. 6 achieves this if $\epsilon$ is a sufficiently small positive real number, increasing the condition number of the singular value matrix $S_W$ and so making Ŵ extremely ill-conditioned. Â and Ŵ are then interrelated using matrix multiplication to produce the ill conditioned matrix B=ÂŴ.

Although by addressing the requirement of fragility Ŵ is now defined using $\epsilon$, Â still depends on an unknown parameter $\hat{s}_r(A)$. For that reason B should be regarded as a parametric family of matrices:

$$B(\hat{s}_r) = \hat{A}(\hat{s}_r)\hat{W}. \quad \text{Eq. 7}$$

This parametric family of matrices $B(\hat{s}_r)$ 110 determines the linear ill-conditioned operator used in the fragile watermarking method, and is resolved by addressing the second requirement:

B. Uniqueness

It is desirable to select from amongst the parametric family of matrices $B(\hat{s}_r)$ a single operator for use in a specific fragile watermark.

For a pre-defined large real number N, there exists a unique value of $\hat{s}_r(A)$, so that the $L_2$-norm solution of the least squares problem $$\min_{x \in \mathfrak{R}^p} \|Bx - b\|_2^2, \quad \text{Eq. 8}$$

is $N^2$. Here, b is an arbitrary vector defining the right-hand side of the linear system to be minimized in Eq. 8.

Thus in an embodiment of the present invention, by selecting a value of N as a key, a corresponding unique value $\overline{s}_r(A)$ can be found from the solution of Eq. 8.

By using this unique value $\overline{s}_r(A)$ as $\hat{s}_r(A)$ 120, a watermarked image block Â dependent both upon key N via Eq. 8 and key K via Eq. 7 is produced using $\hat{A} = U_A \hat{S}_A V_A^T$ 130, with the watermark distributed over the entire block Â through manipulation of the smallest singular value of A.

C. Perceptibility

Whilst the processes described above to address the conditions of fragility and uniqueness are sufficient to provide a watermarked block Â, in an enhanced embodiment of the present invention the selected value of $\hat{s}_r(A)$ is additionally constrained to lie in the interval $\max(eps, s_r(A)-\delta) \leq \hat{s}_r(A) \leq s_r(A)+\delta$, where eps is the machine precision and $\delta$ is a scalar used to control the distortion to the image block A induced by the watermark in Â.

The expression max(eps, $s_r(A)-\delta$) ensures that $\hat{s}_r(A)$ remains nonzero and positive. This condition together with Eq. 2 allows the distortion to be kept below a user-defined value $\delta$.

In an embodiment of the present invention, the method of fragile watermarking of an image I comprises the following steps:

i. Generating a K-dependent watermark pattern matrix W from $\Omega$, or recalling a pre-existing one;
ii. Constructing 110 the parametric family of matrices $B(\hat{s}_r)$ as defined by Eq. 7.
iii. Estimating 120 the unique parameter $\bar{s}_r(A)$, that minimizes the expression:

$$\min_{\hat{s}_r} \left\{ \sum_{i=1}^{q} (u_{B_i}^T b / s_i(B(\hat{s}_r)))^2 - N^2 \right\}, \qquad \text{Eq. 9}$$

(based on Eq. 2) where $u_{B_i}$ is the i-th column of the matrix formed with the right singular vectors of B, $s_i(B)$ are the singular values of B, b is the right-hand side vector given in Eq. 8 and key N is a large real number.

iv. Estimating 130 the watermarked block $\hat{A}=U_A \hat{S}_A V_A^T$ by setting $\hat{S}=\text{diag}(s_1(A), \ldots, s_{r-1}(A), \bar{s}_r(A))$.

In an otherwise similar enhanced embodiment of the present invention, step iii. above comprises estimating the unique parameter $\bar{s}_r(A) \in [\max(\text{eps}, s_r(A)-\delta), s_r(A)+\delta] = [H_0, H_1]$, that minimizes the expression:

$$\min_{\hat{s}_r \in [H_0, H_1]} \left\{ \sum_{i=1}^{q} (u_{B_i}^T b / s_i(B(\hat{s}_r)))^2 - N^2 \right\}, \qquad \text{Eq. 10}$$

In both the directly preceding embodiments, step iv. shows how the value $\hat{s}_r(A)$ in Eq. 5 is chosen, namely by setting $\hat{s}_r(A) = \bar{s}_r(A)$, where $\bar{s}_r(A)$ is the result of the minimization problem of Eq. 9 or 10. Like K, the number N in Eq. 9 or 10 is also secret. Although it is possible to select a value of N dependant on K or vice-versa, higher security is achieved when N and K are chosen independently. Thus, the security of the proposed approach resides in the secrecy of set of keys $\kappa = \{K, N\}$.

In an enhanced embodiment of the present invention, the value of b selected for equations 8, 9 or 10 is made dependant upon a parameter derived from a portion of image I other than current portion A:

For a sequential watermarking process comprising the watermarking of portion $A^{(k)}$ after the watermarking of portion $A^{(k-1)}$, for $k=1, \ldots, L$ of L portions of image I, then the step of calculating $b^{(k)}$ for portion $A^{(k)}$ comprises calculating substantially the following equation part:

$$b^{(k)} = \begin{cases} A^{(k)} Z^{(k)} & \text{for } k = 1 \\ A^{(k-1)} Z^{(k)} & \text{else} \end{cases}, \qquad \text{Eq. 11}$$

where $Z^{(k)}$ is a pseudo-random binary vector.

This enhancement increases the difficulty of successfully undertaking a vector quantisation attack upon the image I, requiring that larger image areas containing several authenticated blocks are replaced. Even then, the blocks at the border of the swapped area will be declared faked:

2. Validating a Fragile Watermark

To validate authenticity and to detect tampered areas, a receiver of a received image I' needs to test if the received image or a portion thereof A' has been tampered with or not. It is assumed that the receiver is a trusted party who knows the secret set of keys $\kappa = \{K, N\}$.

In an embodiment of the present invention, in addition to $\epsilon$ a tolerance value $\tau$ is used in the verification process. This parameter provides tolerance to approximation errors inherent to any numerical process. $\epsilon$ and $\tau$ are fixed numbers and so can be known to the public. Referring to FIG. 2, most steps of the verification procedure coincide with the steps of the watermarking procedure:

Using K, the receiver first generates the watermark pattern or portion thereof W. Next, $\epsilon$ is used to build the matrix $\hat{W}$ by setting $\hat{S}_w = \text{diag}(s_1(W), \ldots, \epsilon)$ as in Eq. 6. Afterwards, the ill-conditioned matrix $B' = A'\hat{W}$ is built 210 and the solution of the minimization problem $$\min_{x \in \Re^p} \|B^+ x - b\|_2^2 \qquad \text{Eq. 12}$$

is calculated 220. Once Eq. 12 has been solved N' is defined as the square root of the norm of the vector x minimizing Eq. 12.

The verification step consists of a comparison between N' and the secret value N 230. A Boolean response is obtained by thresholding the absolute difference $|N'-N|=\gamma$. If $\gamma \leq \tau$, A' is authentic 232, otherwise A' is declared a fake 234, as it is judged that modifications to A' have altered the ill-conditioned matrix $B^+ = A'\hat{W}$ such that the error in solution N' to expected solution N exceeds tolerance threshold $\tau$.

It will be clear to a person skilled in the art that whilst $\hat{s}_r(A)$ and $\hat{s}_t(W)$ are the preferred singular values to be replaced, an embodiment of the present invention may replace a singular value other than $\hat{s}_r(A)$ or $\hat{s}_t(W)$, although for $\hat{s}_r(A)$ this is likely to increase distortion in the watermarked block $\hat{A}$.

It will also be clear to a person skilled in the art that tractable linear and non-linear problems other than the minimisation problem of Eq. 8 and 12 that involve an ill-conditioned operator may be amenable to the methods described herein.

3. Supplementary Information

For the purposes of clarity, the following provides detailed proofs of the ability to find an ill-conditioned operator B for a given A, and the ability to find a value $\bar{s}_r(A) \in (H_0, H_1]$. It also provides a discussion of the possible values of key N.

To prove the ill-conditioning of B, let A and W be two square matrices of the same dimension and $s_k(A)$, $s_k(W)$ their k-th singular values, respectively. Then, $s_{i+j-1}(AW) \leq s_i(A) s_j(W)$, for all integers i, j. (For the proof of this result, see A. Pietsch, *Eigenvalues and s-Numbers*, Cambridge University Press, 1997, Proposition 2.3.12.)

Next, let the smallest singular values of B=AW and W be $s_r(B)$ and $s_t(W)$, respectively. Then $$s_r(B) \leq s_{r-t+1}(A) \cdot s_t(W) = \epsilon \cdot s_{r-t+1}(A) \text{ for } t \leq r. \qquad \text{Eq. 13}$$

This follows directly from the previous result by setting $i=r-t+1$ and $j=t$.

Since $\epsilon$ is chosen to be very small, the inequality Eq. 13 guarantees that the smallest singular value of B is also tiny and therefore extremely ill-conditioned.

Usually, the matrices A and W have full rank, i.e., t=r. However, it is possible to build counterexamples with t>r.

Even in such usual situations Eq. 13 can be applied by setting $s_k(W)=0$ for all $k>r$. Observe that because $\hat{W}$ is artificially constructed, there is nothing to prevents the required values being set to zero. As a consequent the condition $t \leq r$ in Eq. 13 can be assumed in any case.

In order to provide the existence of $\bar{s}_r(A) \in [H_0, H_1]$, minimizing the expression Eq. 10 for a fixed value N, consider the real valued functions $h(z):(H_0, H_1] \to \Re^+$, and $g(z):[H_0, H_1] \to \Re^+$ defined as $h(z)=s_r(B)$ and $$g(z) = \min_{x \in \Re^p} \|B^*(z)x - b\|_2^2. \quad \text{Eq. 14}$$

$h(z)$ can be written as $h(z)=s_r(A(z)\hat{W}) \equiv (h_1 \circ h_2)(z)$, with $h_1(z)= s_r(B(z))$ and $h_2(z)=A(z)\hat{W}$. The two functions $h_1$ and $h_2$ are continuous in the interval $[H_0, H_1]$. Hence, $h(z)$ is also continuous in $[H_0, H_1]$. The continuity of $h(z)$ can now be used to prove that $g(z)$ is continuous in $(H_0, H_1]$. Using Eq. 2 it is straightforward to derive the following expression:

$$g(z) = \sum_{i=1}^n (u_{B_i(z)}^T b / s_i(B(z)))^2. \quad \text{Eq. 15}$$

Thus, $g(z)$ is the sum of quotients of continuous functions. Therefore, $g(z)$ is also continuous in $[H_0, H_1]$.

Now, consider h max=max($g(z)$) and h min=min($g(z)$). If $N \in [g(h \text{ max}), g(h \text{ min})]$ then it exists $\bar{z} \in [H_0, H_1]$ such that $g(\bar{x})=N$. This follows from the continuity of $g(z)$ in $[H_0, H_1]$ and the mean-value theorem of continuous functions.

The above considerations illustrate the effectiveness and feasibility of the proposed invention. The underlying operator of Eq. 8 can be made extremely ill-conditioned while the norm of its solution is kept equal to N. Furthermore, by selecting $\hat{s}(A) \in [H_0, H_1]$ the distortion on the original image remains below the input parameter $\delta$.

However, this last property constrains the variation of $\hat{s}_r(A)$ to a very small interval. Since $\hat{s}_r(A)$ depends on N, an important question arises of how the small interval $[H_0, H_1]$ constrains the set of feasible values N.

Since N is a secret key it is desirable that it is extremely difficult to estimate. Obviously the smaller the set of feasible values for N, the easier it is to estimate N and so mount a successful attack. This concern is addressed below.

Fortunately, the range of values that can be used for N is large, making difficult for an attacker to estimate it. Since the distortion introduced by the watermark can be strictly controlled by the distortion coefficient $\delta$, this coefficient defines the feasibility interval $[H_0, H_1]$. Clearly, this interval is very small. Its maximum length does not exceed $2\delta$ and according to the considerations above it defines the range of permissible values for $N \in [g(h \text{ max}), g(h \text{ min})]$. Since N should be a large number to improve the security of the proposed algorithm, it is also important to show that the interval of permissible values of N is also very large. Variations of $z \in [H_0, H_1]$ are reflected in the variations of the smallest singular value of B. According to Eq. 13 the smallest singular value of B is very closet to $\epsilon$. This fact can be used to find an estimate for the interval $[g(h \text{ max}), g(h \text{ min})]$. For this we consider the hyperbola $p(z)=C+D/y^2$ with $$C = \sum_{i=1}^{r-1} (u_{B_i}^T b / s_i(B))^2$$

and $D=(u_{H_r}^T b)^2$. Since the variation of $z \in [H_0, H_1]$ determines the variation of $p(z)$, this gives the range for possible values N. Observe that changes in z also affect C and D, but actually the smallest singular value of B is the leading term determining the behaviour of $p(z)$. Clearly, $p(z) \to \infty$ if $z \to 0$. Furthermore, p maps tiny intervals very close to zero into very large intervals. For instance, if $\epsilon=10^{-16}$ and $\delta=10^{-2}$, then z will approximately vary between the machine precision eps, e.g., $10^{-32}$, and $10^{-2}$. In this case $[g(h \text{ max}), g(h \text{ min})] \approx [10^2, 10^{32}]$. As a consequence, for this particular example N could be selected from the interval $N \in [10^2, 10^{32}]$. These arguments show that the range of permissible values of N is huge and it would be extremely hard for an attacker to estimate N.

In this specification, the expression 'condition number' (or 'matrix condition number') is referred to. This expression is well known in the field of matrix computations. The condition number $\kappa(A)$ of a square matrix A is defined as $\kappa(A)=\|A\|\|A^{-1}\|$ where $\|.\|$ is any valid matrix norm.

The (matrix) condition number is basically a measure of stability or sensitivity of a matrix (or the linear system it represents) to numerical operations. In other words, we may not be able to trust the results of computations on an ill-conditioned matrix. Matrices with condition numbers near 1 are said to be well-conditioned. Matrices with condition numbers much greater than one, e.g. $10^n$ for an n-sided matrix (such as around $10^5$ for a 5×5 Hilbert matrix), are said to be ill-conditioned. Thus, a condition number less than 5, preferably near to 1, can be considered to give a well conditioned matrix and condition numbers greater than 50, preferably about 100 or more, can be considered to give an ill-conditioned matrix.

The invention claimed is:

1. A method of fragile watermarking comprising:
generating at least a first ill-conditioned operator related to values extracted from an image or portion thereof A; and
replacing a non-zero singular value of a singular value matrix $S_A$ of an image or portion thereof A, with a solution to a linear equation comprising the ill-conditioned operator, wherein the non-zero singular value to be replaced is the smallest non-zero singular value $S_r(A)$ in a singular value matrix $S_A$ of rank r.

2. A method of fragile watermarking according to claim 1 wherein the ill-conditioned operator is generated by altering a value to increase the operator's condition number.

3. A method of fragile watermarking according to claim 1, wherein a non-zero singular value of a single value matrix $S_W$ of a watermark pattern or portion thereof W is replaced, such that said replacement increases the condition number of the singular value matrix $S_W$ of the watermark pattern or portion thereof W, wherein the non-zero singular value to be replaced is the smallest non-zero singular value $S_t(W)$ in a singular value matrix $S_W$ of rank t.

4. A method of fragile watermarking according to claim 3, wherein a replacement non-zero singular value of singular value matrix $S_W$ of a watermark or portion thereof W is calculated by calculating substantially the following equation part:

$$s_r(W)=\epsilon,$$

where $\epsilon$ is a small positive real number that increases the condition number of the singular value matrix $S_W$.

5. A method of fragile watermarking according to claim 1, wherein the step of generating at least a first ill-conditioned operator comprises calculating substantially the following equation part:

$$B=\hat{A}\hat{W},$$

where $\hat{W}$ is substantially constructed according to $\hat{W}=U_W \hat{S}_W V_W^T$, $\hat{S}_W$ comprising at least one altered singular value $s_r(W)=\epsilon$, and such that B forms a parametric family of matrices $B(\hat{s}_r)=\hat{A}(\hat{s}_r)\hat{W}$ for possible values of $\hat{s}_r(A)$.

6. A method of fragile watermarking according to claim 5, wherein $\hat{s}_r(A)$ is determined by an $L_2$-norm solution of the at least squares problem $$\min_{x \in \Re^p} \|Bx - b\|_2^2$$

to equal the square of a predefined key N of predetermined value, where b is an arbitrary vector.

7. A method of fragile watermarking according to claim 1, wherein the replacement non-zero singular value of singular value matrix A is calculated by calculating substantially the following equation part:

$$\min_{\hat{s}_r(A)} \left\{ \sum_{i=1}^{q} (u_{B_i}^T b / s_i(B(\hat{s}_r)))^2 - N^2 \right\},$$

where $u_{B_i}$ is the I-th column of the matrix formed with the right singular vectors of B.

8. A method of fragile watermarking according to claim 7, wherein $\hat{s}_r(A)$ further satisfies
$\hat{s}(A)=\bar{s}_r(A)\epsilon[\max\ (\text{eps},\ s_r(A)-\delta),\ s_r(A)+\delta],\ s_r(A)+\delta]=[H_0, H_1]$, where $\delta$ is a distortion control and eps is machine precision, such that the step of calculating the replacement non-zero singular value comprises calculating substantially the following equation part:

$$\min_{\hat{s}_r \in [H_0, H_1]} \left\{ \sum_{i=1}^{q} (u_{B_i}^T b / s_i(B(\hat{s}_r)))^2 - N^2 \right\},$$

with all terms as defined herein.

9. A method of fragile watermarking according to claim 8, wherein for a sequential watermarking process comprising the watermarking of portion $A^{(k)}$ after the watermarking of portion $A^{(k-1)}$, k=1, . . . , L of L portions, then the step of calculating $b^{(k)}$ for portion $A^{(k)}$ comprises calculating substantially the following equation part:

$$b^{(k)} = \begin{cases} A^{(k)}Z^{(k)} & \text{for } k = 1 \\ A^{(k-1)}Z^{(k)} & \text{else} \end{cases},$$

where Z(k) is a pseudo-random binary vector.

10. A method of fragile watermarking according to claim 1, wherein a watermarked image or portion thereof Â comprises calculating substantially the following equation part:

$$\hat{A}=U_A \hat{S}_A V_A^T$$

where $\hat{S}_A$ comprises at least one replaced singular value, $U_A$ and $V_A$ being left and right singular matrices.

11. A method of fragile watermarking according to claim 1, wherein a watermark pattern or portion thereof W is generated by a pseudo-random generator seeded by a key K of predetermined value.

12. A method of fragile watermarking according to claim 11, wherein the watermark pattern or portion thereof W is generated by a pseudo-random generator seeded by a key K of predetermined value, combined with either a single or repeated instance of a logo.

13. A method of fragile watermarking according to claim 1, comprising the following steps:
  i. generating a K-dependent watermark pattern W from $\Omega$, or recalling a pre-existing one;
  ii. constructing a parametric family of matrices $B(\hat{s}_r)$;
  iii. estimating a unique parameter $\bar{s}_r(A)$, that minimizes the expression $$\min_{\hat{s}_r} \left\{ \sum_{i=1}^{q} (u_{B_i}^T b / s_i(B(\hat{s}_r)))^2 - N^2 \right\};$$

and
  iv. estimating the watermarked block $\hat{A}=U_A \hat{S}_A V_A^T$ by setting $\hat{S}=\text{diag}(s_1(A), \ldots, s_{r-1}(A), \bar{s}_r(A))$.

14. A method of fragile watermarking according to claim 1, comprising the following steps:
  i. generating a K-dependent watermark pattern W from $\Omega$, or recalling a pre-existing one;
  ii. constructing a parametric family of matrices $B(\hat{s}_r)$;
  iii. estimating a unique parameter
   $\bar{s}(A)\epsilon[\max(\text{eps}, s_r(A)-\delta), s_r(A)+\delta]=[H_0, H_1]$, that minimizes the expression:

$$\min_{\hat{s}_r \in [H_0, H_1]} \left\{ \sum_{i=1}^{q} (u_{B_i}^T b / s_i(B(\hat{s}_r)))^2 - N^2 \right\};$$

iv. estimating the watermarked block $\hat{A}=U_A \hat{S}_A V_A^T$ by setting
   $\hat{S}=\text{diag}(s_1(A), \ldots, s_{r-1}(A), \bar{s}_r(A))$.

15. A method of verifying a fragile watermark comprising: generating at least a first ill-conditioned operator by altering a value to increase its condition number, said ill-conditioned operator being related to values extracted from a received image or portion thereof A*; and calculating a solution to the least squares problem $$\min_{x \in \mathfrak{R}^p} \|B^* x - b\|_2^2$$

where $B^k = A^k \hat{W}$.

16. A method of verifying a fragile watermark according to claim 15, wherein a positive square-root N* of the $L_2$-norm solution of the least squares problem $$\min_{x \in \mathfrak{R}^p} \|B^* x - b\|_2^2$$

is compared with key N; and the received image or portion thereof A* comprising the fragile watermark is declared authentic if $|N^* - N| \leq \tau$, where $\tau$ is a threshold value.

17. A method of verifying a fragile watermark according to claim 16, wherein the value N* is calculated by calculating substantially the following equation part:

$$(N^*)^2 = \sum_{i=1}^{n} \left(u_{B_i^*}^T b / s_i(B^*)\right)^2;$$

N* is compared with key N; and the received image or portion thereof $A^k$ comprising the fragile watermark is declared authentic if $|N^k - N| \leq \tau$, where $\tau$ is a threshold value.

* * * * *